Jan. 28, 1969  G. ROLLAT  3,424,055
TIGHTENING DEVICE OF A TOOL IN A SPINDLE
Filed Nov. 12, 1965  Sheet 1 of 2

INVENTOR
GERMAIN ROLLAT
By Young & Thompson
ATTYS.

INVENTOR
GERMAIN ROLLAT

United States Patent Office 3,424,055
Patented Jan. 28, 1969

3,424,055
TIGHTENING DEVICE OF A TOOL
IN A SPINDLE
Germain Rollat, Geneva, Switzerland, assignor to Société Genevoise, d'Instruments de Physique, Geneva, Switzerland, a corporation of Switzerland
Filed Nov. 12, 1965, Ser. No. 507,810
Claims priority, application Switzerland, Dec. 4, 1964, 15,739/64
U.S. Cl. 90—11                         1 Claim
Int. Cl. B23c 7/00; B23b 31/10, 31/26

ABSTRACT OF THE DISCLOSURE

A rotary tool holder for tools having conical shank portions is adaptable either to the large American A.S.A. cone or the slender Morse cone, by means of an adaptor whose outer contour is that of the American A.S.A. cone and that has an inner socket to receive a Morse cone. A rod extends through the spindle and is urged away from the cone by a spring whose force varies inversely as the distance of the rod end from the cone. A large cone is attached to the rod end by a short extension which compresses the spring to exert relatively large force on the rod; while alternatively a slender cone is attached to the rod end by a longer extension so that the spring force is reduced upon the slender cone.

The spindles of machine tools present ordinarily at their free end a female conical socket intended to receive a male cone fast with a tool to be driven by said spindle. The tightening of the male cone in the female socket is obtained by means of a tightening rod which is co-axial with the spindle.

Generally the cones and sockets are either of the Morse type or of the American A.S.A. type. For a given spindle diameter the Morse cone, having a solid angle of only 5%, ensures a better centering of the tool; on the other hand the American cone, having a solid angle of 29.17%, is better for the fixing of tools of great diameter.

In the known tightening devices the tightening rod is actuated either by hand or by means of an electrical motor, or further, by means of a hydraulic piston.

The Morse cone presenting a very small solid angle constitutes a self-locking cone so that the effort to be applied to the tightening rod to ensure a good holding of the tool in position on the spindle is relatively low whereas the effort necessary for its loosening is much greater.

With the American A.S.A. cone, the opening angle of which is greater, the tightening effort in order to ensure a good holding of the tool on the spindle is relatively great whereas the effort for its loosening is very small.

Each of both said types of cones has its advantages and its drawbacks so that it is useful for the user to have both types of cones on the same spindle.

The tightening device for a tool on a spindle, according to the present invention, comprises a female socket of great opening and having a removable sleeve with a male cone of great opening and a female socket of small solid angle fastened within the said female socket of great opening and comprising further a tightening rod co-axial with the spindle, a spring acting on said tightening rod to cause the tightening of the tool as well as a hydraulic jack which acts on said rod against the action of said spring to cause the untightening. This device is characterized by the fact that the tightening stroke is such that the compression of the spring is greater for the tightening position of a tool which is located in the female socket with great opening of the spindle than for the tightening position of a tool which is located in the female socket of small solid angle of the removable sleeve.

The attached drawing shows schematically and by way of example one embodiment of the tightening device according to the invention.

Figure 3:
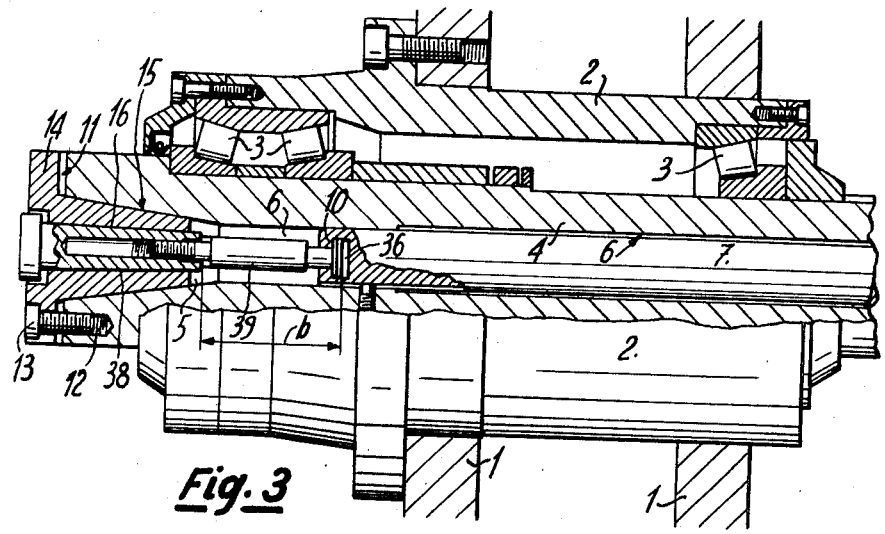
FIGURE 3 is a partial cross section view of the end of the spindle provided with the removable sleeve.
Figure 2:
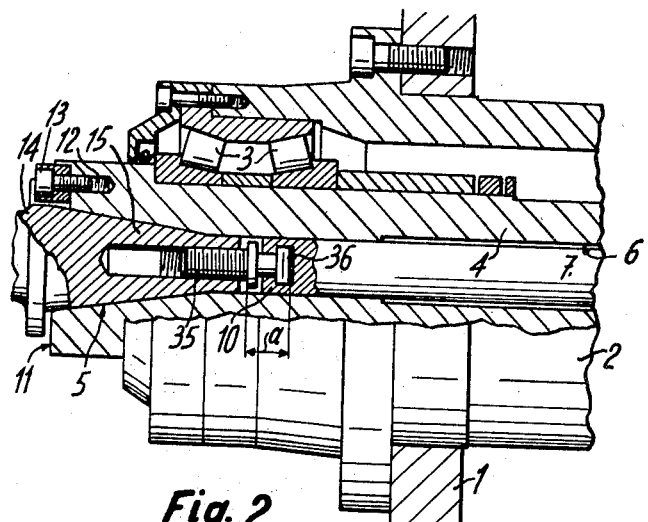
FIGURE 2 is a partial cross section view on a greater scale of the end of the spindle.

According to the attached drawing a head 1 of the machine tool carries a sleeve 2 provided with conical roller bearings 3 (FIGS. 2 and 3) in which the nose of the spindle 4 revolves freely. The front end of the nose of the spindle presents a conical socket 5 having a solid angle (29.17%) of the American A.S.A. type. The spindle 4 has an axial hole 6 in which a tightening rod 7 is located, the rear end of which presents a shoulder 8 on which acts a spring 9, which bears on an abutment fast with the spindle 4. The front end of the tightening rod 7 comprises a coupling part 10 intended to cooperate with the tool.

The frontal face 11 of the nose of the spindle presents tapped holes 12 in which bolts 13 can be screwed for fixing a removable sleeve 14 presenting on the one hand a male cone 15 of great opening entering in the female socket 5 of the nose of the spindle and on the other hand a female socket 16 of small solid angle (5%).

The rear end of the spindle is constituted by a sleeve 17 rigidly fixed on the front part of the spindle 4 and longitudinal keyed inside a sheath 18 rotatively mounted on the head 1 by the intermediary of bearings 19, 20. The axial position of this sheath 18 is maintained by the said bearings 19 and 20 or by any other known means. A gear wheel 21 is fixed rigidly on said sheath 18 and connected to a driving motor by a kinematic linkage which is not shown and enables the driving in rotation of the spindle. This sleeve 17 comprises near its rear end a wall 22 pierced by a hole 23.

A hydraulic jack 24 is mounted inside the sleeve 17 through the intermediary of bearings 25, 26 located between the outside wall of said hydraulic jack 24 and the inside wall of the sleeve 18 on the one hand and by a thrust bearing 27 located between the frontal face of the wall 22 and the frontal rear face of the hydraulic jack 24 on the other hand. The axial position of this hydraulic jack is thus fixed; even so said jack is not driven by rotation of the sleeve but is angularly fixedly secured with respect to the head 1. In fact the hydraulic cylinder 24 is connected by a feeding duct 28 emerging from its frontal rear face, traversing the wall 22 through hole 23 and extending through the hole 29 out of the fixed part of the head 1.

This hydraulic jack houses a piston 30 the rear face of which is subjected to the action of a fluid delivered by the feeding duct 28 and the frontal face of which has a pushing member 31 the fore end of which emerges from the hydraulic jack 24 and is intended to enter into contact with the rear face of the tightening rod 7 for the driving of said latter.

The feeding duct 28 is connected through the intermediary of an electromagnetic valve 32 either to a source of fluid under pressure by the intermediary of a duct 33 or to a discharge duct 34.

Figure 1:
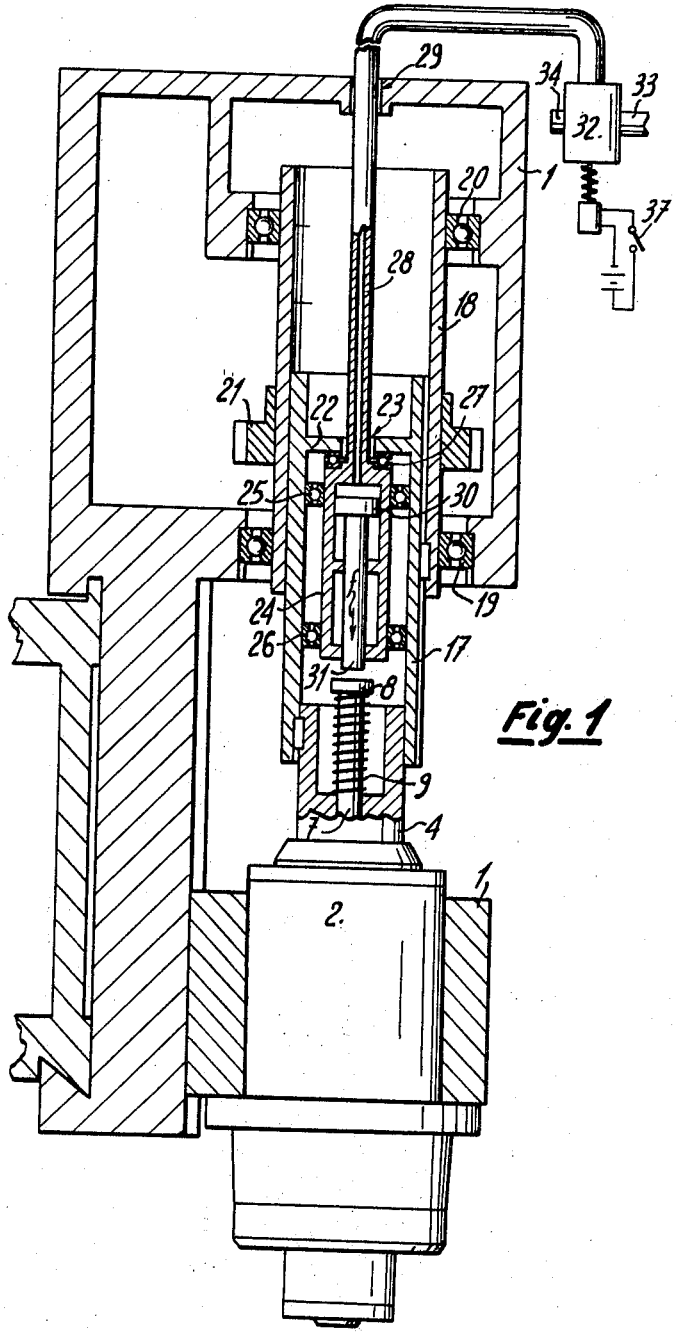
FIGURE 1 is a view of the tool-carrying spindle, certain parts being seen in axial cross section.

The working of the tightening device described is the following:

When the operator wants to fix on the spindle a tool of great diameter comprising a male cone 15 (FIG. 2) having a great opening (29.17%) he introduces this male cone in the conical housing 5 of the nose of the spindle. This male cone 15 is provided with an extension 35 presenting a length $a$ and which carries at its extremity one part 36 of the parts of a coupling the other part 10 of which is fast on the end of the tightening rod. By switching off the interrupter 37 (FIG. 1) the operator causes the energization of the coil of the electromagnetic valve 32 and the feeding of the hydraulic jack with fluid under pressure. This fluid under pressure causes an axial displacement of the piston 30 and pushes its pushing member 31 against the rear extremity of the tightening rod 7. This fluid under pressure, through the intermediary of the piston 30, exerts an axial push on the tightening rod 7 against the action of the spring 9 and causes thus an axial displacement of this rod in the direction of the arrow $f$. From that moment the operator can easily connect the tightening rod 7 to the extension 35 of the tool in the conical housing 5. By opening the interrupter 37 the operator causes the discharge of the hydraulic jack and the rearward displacement of the tightening rod under the action of the spring 9 and thus the tightening of the tool in position on the spindle. The spring 9 which is strongly compressed due to the short length $a$ of the extension 35 of the tool, exerts a great traction on the tightening rod when the male cone 15 of the tool enters in contact with the conical walls of the housing 5 so that the tool is firmly maintained in working position on the nose of the spindle.

In order to free the tool the operator closes the interrupter 37 in order to cause the feeding of the hydraulic jack with fluid under pressure and thus the forward displacement of the tightening rod against the action of the spring.

However, when the operator want to fix on the nose of the spindle a tool of small diameter provided with a male cone 38 of small solid angle (FIG. 3) he fixes first on the nose of the spindle the removable sleeve 14 by means of the bolts 13. Then he causes a forward axial displacement of the tightening rod by closing the interrupter 37. He introduces then in the female socket 16 of the removable sleeve 14 the male cone 38 of the tool which is provided with an extension 39 presenting a length $b$ and which carries at its extremity the part 36 of the coupling the other part 10 of which is carried by the extremity of the tightening rod. This rod being in a foremost position the operator engages the two parts of the coupling 10, 36, one in the other and connects thus mechanically the tool with the tightening rod. The operator opens then the interrupter 37 in order to connect the hydraulic jack to the discharge and causes under the action of the spring 9 the rearward displacement of the tightening rod and thus the tightening of the tool in working position in the nose of the spindle.

The loosening of the tool inserted in the female socket of less conicity of the removable sleeve 24 is obtained by the setting under pressure of the hydraulic jack.

The length $b$ of the extension 39 being greater than the length $a$ of the extension 35 it is to be noted that when the male cone 35 of the tool enters in contact with the wall of the female socket 16 of the removable sleeve 14 the compression of the spring 9 is less than when a tool provided with a male cone 15 of great opening is inserted in the housing 5 of the nose of the spindle. As a consequence this spring 9 exerts on the tightening rod a lower traction when it is in its tightening position for a tool inserted in the female socket of smaller solid angle of the removable sleeve 14 than when this rod is located in its tightening position for a tool inserted in the female socket of great opening of the nose of the spindle.

I claim:

1. A machine tool holder comprising a rotary spindle having a frusto-conical socket at one end, a rod which is movable along the axis of the spindle, spring means biasing the rod axially away from said end, a hydraulic jack adapted to engage the rod when actuated to move it in the tool-releasing direction toward said end, an adaptor having an outer frusto-conical surface complementary to the spindle socket, the adaptor having in it a coaxial frusto-conical socket of solid angle substantially smaller than that of the spindle socket, means releasably securing the adaptor in the spindle socket, movement of the rod toward said end compressing said spring means, first means for interconnecting the end of the rod adjacent the spindle socket with a tool in said adaptor, and second means for interconnecting said end of the rod with a tool when the adaptor is not used such that the rod is farther from the end of the spindle and the spring means is less compressed when the adaptor is used than when the adaptor is not used, said spring means exerting more force on said rod when compressed than when extended so that the force exerted on the surface of a tool shank normal to that surface is substantially the same regardless of whether said adaptor is used.

References Cited

UNITED STATES PATENTS

| | | | |
|---|---|---|---|
| 1,442,659 | 1/1923 | Groene | 279—103 |
| 3,118,345 | 1/1964 | Bullard | 279—4 |
| 1,794,361 | 3/1931 | Armitage et al. | 90—1.1 |
| 1,794,361 | 3/1931 | Armitage et al. | 90—11.1 |
| 3,177,775 | 4/1965 | Alisauskis | 90—11.1 |

LEONIDAS VLACHOS, *Primary Examiner.*

U.S. Cl. X.R.

279—4